Feb. 11, 1964     H. J. DE BRUIN     3,120,776
LIVE CENTER
Filed Jan. 23, 1962

INVENTOR.
Hugo J. de Bruin,
BY Parker & Carter
Attorneys.

3,120,776
LIVE CENTER
Hugo J. de Bruin, Esmond, Ill., assignor to Ideal Industries, Inc., Sycamore, Ill., a corporation of Delaware
Filed Jan. 23, 1962, Ser. No. 168,130
1 Claim. (Cl. 82—33)

This invention relates to a rotating center tool; in particular, a rotating tool for a lathe or the like to support one end of the workpiece.

An object of this invention is a rotating center tool which allows an improved replacement of a removable contact insert.

Another object is a rotating center tool which reduces possibility of damage to the rotating tool when a removable contact insert is replaced.

Another object is a rotating center tool which permits replacement of the removable contact insert without contaminating ball bearing lubrication.

Another object is a rotating center tool wherein replacement of the removable contact insert does not expose the ball bearing lubricating system.

Another object is a rotating center tool wherein the ball bearing lubricating system remains closed when the contact insert is removed.

Another object is a rotating center tool wherein the threaded bore for the removable contact insert does not communicate with the lubricating path of ball bearings.

Another object is a rotating center tool wherein the threaded bore for the contact insert is separated from the lubricating system by a seated plug.

Another object is a rotating center tool having a tightly seated plug separating the lubricating system from the threaded bore which receives the removable contact insert.

Figure 1:
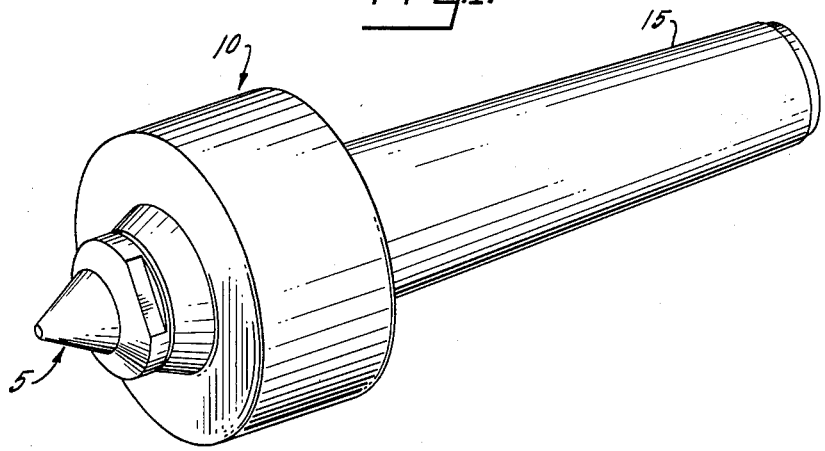
Figure 2:
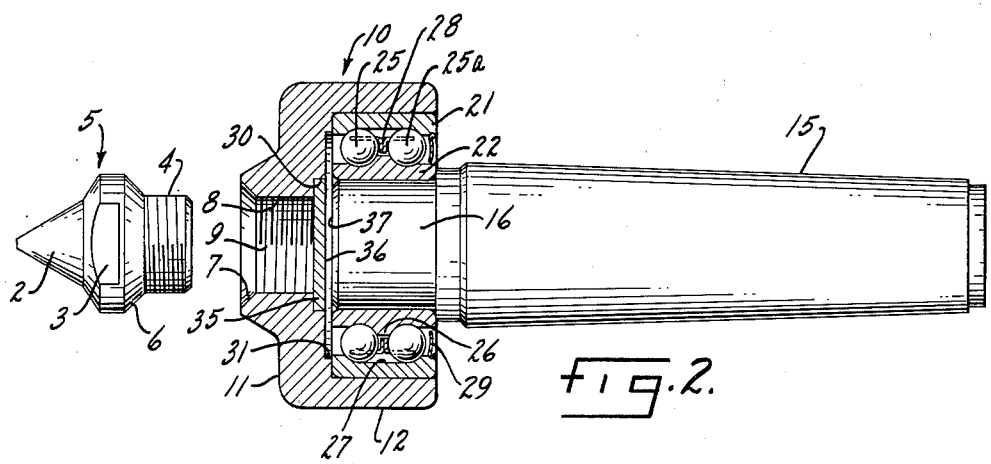
Figure 3:
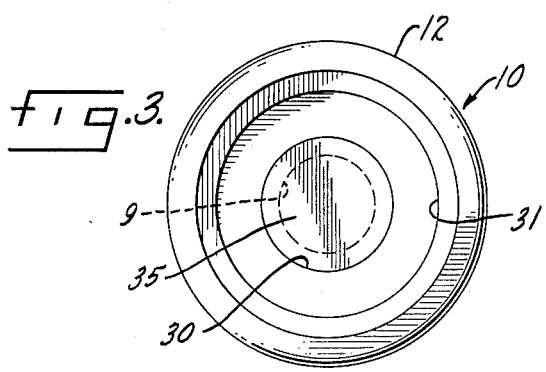

The foregoing objects along with other objects are attained by the invention which will be described in detail and which is shown in the attached drawings wherein:

FIGURE 1 is a perspective view of the center tool,
FIGURE 2 is an exploded side elevation in partial cross section of the center tool, and
FIGURE 3 is an end view of the housing with structures removed.

The center tool shown in FIGURE 1 is commonly used to center the free end of a workpiece in a lathe. The contact insert, shown here as a conical nosepoint 5, contacts the center of one end of a rotating workpiece. The center tool has a rotating housing or cap shown generally as 10 which may rotate about a double row of bearings shown in FIGURE 2. The double bearings, in turn, rotate around one end of a shank 15. The center tool is appropriately supported somewhere along its shank by means which are not shown.

The relationship of the various parts in the center tool is better seen in FIGURE 2 wherein the housing or cap 10 is shown as having an end wall 11 and a continuous side wall 12. In about the middle of the end wall 11 is seen a bore 9 which is threaded in at least a portion thereof as at 8. The bore 9 receives the closely fitting contact insert 5. The threaded neck or nub 4 of the insert engages the threaded portion 8 within the bore, and when the insert is fully threaded within the bore, the offset surface 6 lies flush against mating surface 7 in the bore 9. The contact insert is shown as having an integral nut 3 and a contact point which is shown as a nosepoint 2.

A continuous annular race 21 is tightly engaged to the inside surface of the continuous side wall 12 by an interference fit or the like. Such a tight fitting may be realized by pressure insert, shrink fit or equivalent means. Spaced from the continuous race 21 is a second and coacting continuous race 22. Ball bearings are shown in the space between the first and coacting races. Shown here is a double row angular contact bearing or a row formed by bearings 25 and a row formed by bearings 25a. Other possibilities include a double row deep groove bearing. The races shown in this bearing arrangement have a continuous projection or ridge 26 in the first continuous race and a continuous groove 27 in the second and coacting continuous race. The ball bearings are seated and spaced by said races and permit free rotation of the housing or cap 10. A continuous bearing cage 28 for holding and separating the bearings is seen in solid and phantom outline.

The second continuous race 22 is securely fixed along its inner circumference against the end 16 of the shank 15. The end of the shank 15 is securely engaged within continuous race 22 preferably by an interference fit which may include a pressure fit or a shrink fit. The foregoing bearing arrangement enables the cap and attached contact insert to rotate while the shank 15 and race 22 remain stationary. In race 21 an angular shield 29 is mounted which extends to but does not contact the inner race 22. While rotating, centrifugal force will tend to keep lubrcation in bearing. The shield 29 is used to close the lubricating area, but the lubrication is principally retained in the bearing by the centrifugal force of the rotating housing.

The inside of the end wall 11 has an offset recessed portion which is made up of an inner smaller area formed by annular shoulder 30 and a superposed larger area which is formed by annular shoulder 31. Seated within the smaller area is a thin flat plug 35, and such plug is made to tightly engage the continuous annular shoulder 30 by a pressure fit. Other and additional sealing means may also be used. The face 36 of the plug 35 together with the tip 37 of the shank 15 define a substantially enclosed space or clearance formed from the larger area. This essentially enclosed space connects the annular spaces wherein the bearings 25 and 25a ride. The bearing space between races 21 and 22 and the essentially enclosed space formed between the tip of shank 15 and the face 36 of the plug 35 form the lubricating system of the rotating center tool. The plug blocks any entrance of dirt or other particulate material which would impair the functioning of the lubricating and bearing system. It is not essential that the plug be constructed of any particular material, and it has been found that a soft light material such as aluminum is usefully employed. Such a materiaf is inexpensive and permits easy removal and replacement. Durability and hardness are not particularly required because the purpose of the plug is to prevent or block entry of particulate material into the lubricating system of the rotating center tool.

In FIGURE 3, an end view of the inside of the rotating housing with shank and bearing assembly removed shows the continuous wall 12 and a non-recessed portion of the end wall 11. The plug 35 is shown seated in the smaller area of the recessed portion and tightly engaged against the shoulder 30. The bore 9 is shown in phantom outline, and the peripheral limit of the larger area in the recessed portion is indicated by shoulder 31.

The use and operation of my invention are as follows:

The contact centers in rotating center tools eventually wear down after extended use, and such contact centers are often machined so they can be removed from the centering tool and replaced with a new unit. The cap or housing which receives such removable contact centers has a threaded bore fashioned therebetween to receive the threaded nub of a contact center. Other means to seat the insert include a self-holding tapered end on the insert adapted to engage a mating seat in the bore. Such a bore communicates with the lubricating path in the bearing system of the rotating center tool and this communication allows entry of particulate materials which could damage the lubrication and the performance of the bearings within the housing.

A bottom tap in the end wall of the housing is an undesirable procedure because it is expensive and difficult. The lubrication and bearings of a rotating center tool are now protected from introduction of particulate matter through the open bore by providing a special recessed portion on the inside end wall of the housing and placing in a part of said recessed portion a tightly fitting plug which engages continuous and annular shoulders within the end wall.

The recessed portion has an inner smaller area defined by a continuous annular shoulder 30 and an outer larger area defined by a continuous annular shoulder 31. The inner and outer areas form, in part, a common recessed portion. Such recessed portion surrounds the bore 9 in the end wall 11 of the rotating cap 10. A flat annular plug 35 is seated in the smaller area of the recessed portion in tight engagement with shoulder 30, and thereby closes or blocks one open end of the bore in the end wall of the rotating cap. The outer and larger area is made into an essentially enclosed space by the face 36 of the plug 35 and by the tip 37 of the shank 15. The end of the shank 15 is fixed to the inner annular surface of the contact race 22 by an interference fit or by equivalent means. The end of the shank extends into the housing up to the inside of the end wall 11 of said housing, that is, the tip 37 of the shank is aligned with the inside of the end wall. The tip of the shank and the face 36 of the plug 35 form an essentially enclosed space out of the larger outer area.

The essentially enclosed space connects the spaces between the races and the bearings to provide a lubricating path, and the lubrication and bearings are maintained free from contact with particular materials which may enter the bore 9 in the end wall of the housing. The contact insert may be removed by turning the nut 3 on the insert 5 and unscrewing the insert from threaded engagement with the interior of the bore. A new insert may then be screwed into engagement. During such replacement, any particulate matter from the outside may enter the bore but will not reach the lubrication and bearings because of the plug tightly placed within the smaller area of the recessed portion. Any foreign matter lodged in the threads may also be blown out to insure good thread engagement without forcing that matter into the lubricating area.

The foregoing invention can now be practiced by those skilled in the art. Such skilled persons will know that the invention is not necessarily restricted to the particular embodiments presented herein. The scope of the invention is to be defined by the terms of the following claim as given meaning by the preceding description.

I claim:

A centering tool for a lathe which includes, in combination, a hollow housing having an end wall and a continuous side wall, a bore in the end wall, at least a portion of said bore threaded to receive a removable contact insert, first continuous bearing races fixed to the inside of the continuous side wall, continuous coacting bearing races spaced from the first bearing race, the end of a shank securely held within the continuous coacting bearing races, a plurality of ball bearings disposed between said first and coacting races to permit rotational movement of the housing about the end of the shank, an offset recessed portion in the inside end wall formed by an inner continuous shoulder defining a smaller inner area and an outer continuous shoulder defining a larger outer area, said smaller and outer areas forming, in part, a common recessed portion, a flat plug seated in the smaller area and tightly engaged with the inner continuous shoulder, the tip of the shank aligned with the inside end wall adjacent the recessed portion, the tip of the shank partially enclosing one side of the larger area and the flat plug enclosing the other side of the larger outer area, and said partially enclosed larger outer area communicating with the space between the first and coacting races to provide a lubricating path for the bearings.

References Cited in the file of this patent

UNITED STATES PATENTS

| | | |
|---|---|---|
| 1,372,577 | Wallenberg | Mar. 22, 1921 |
| 2,016,843 | Fautz | Oct. 8, 1935 |
| 2,313,963 | Patrick | Mar. 16, 1943 |
| 2,711,935 | Miles | June 28, 1955 |